Patented July 17, 1934

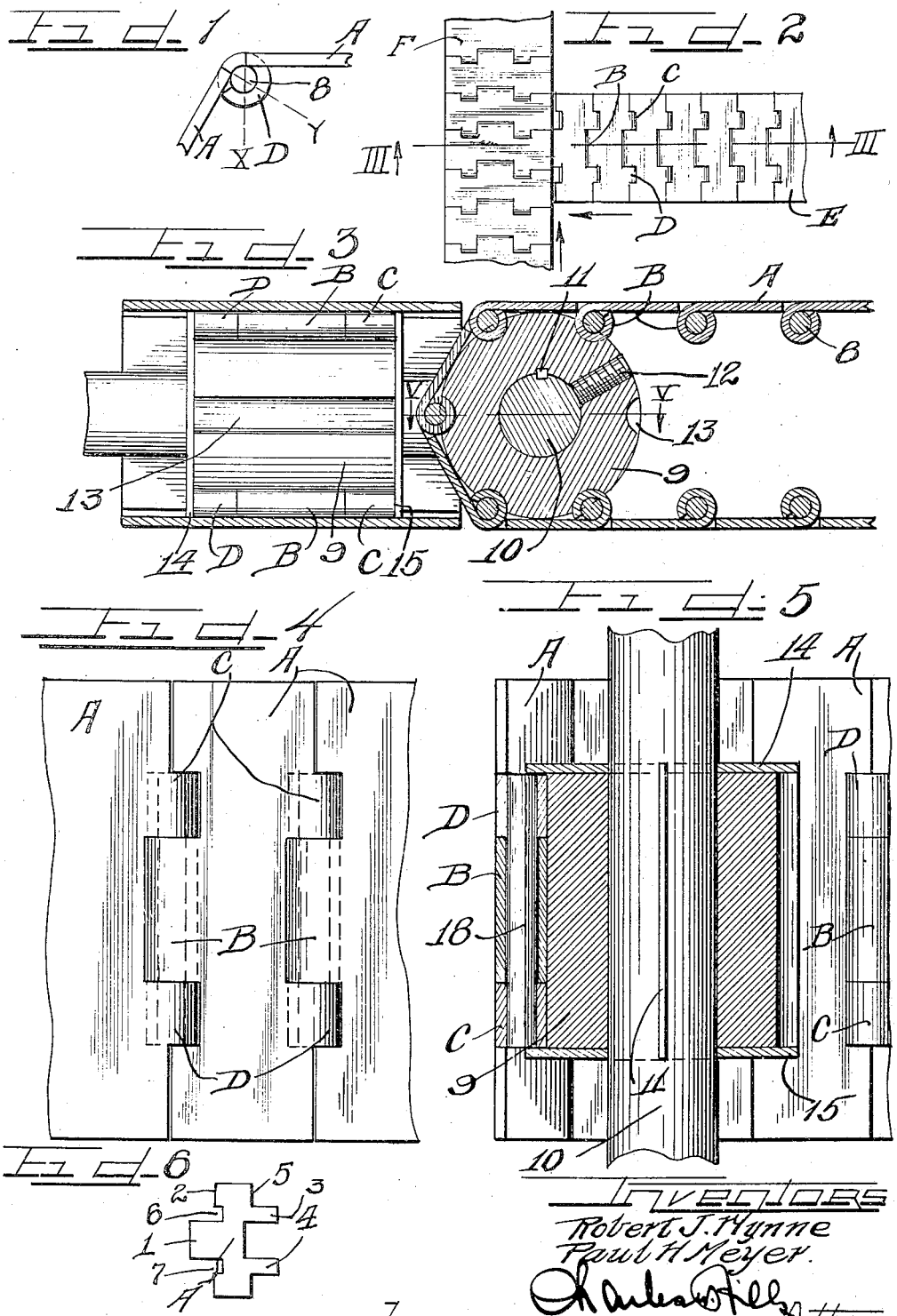

1,966,659

UNITED STATES PATENT OFFICE 1,966,659

CONVEYER CHAIN

Robert J. Wynne and Paul H. Meyer, Bellwood, Ill., assignors to Solar-Sturges Mfg. Co., Melrose Park, Ill., a corporation of Illinois Application January 20, 1932, Serial No. 587,722

1 Claim. (Cl. 198—195)

The present invention relates to conveyer chains and method of making same and more particularly to a conveyer chain having the characteristics of a belt in action.

An object of the present invention is to provide a conveyer chain made of links of sheet metal.

Another object of the invention is to provide a conveyer chain so constructed as to eliminate gaps between adjacent links during articulation.

A further object of the invention is to provide a link chain wherein the links are connected by hinge joints.

A still further object of the invention is to provide a link chain consisting of links connected by hinge joints wherein the drive is against the ears surrounding the hinge pintles.

Another and yet further object of the invention is to provide a conveyer chain consisting of links fashioned from sheet metal connected by hinge joints to prevent lost motion between links thereby eliminating noise.

Another and still further object of the invention is to provide a link conveyer chain which performs with belt action, that is to say, functions without any part of any links projecting outwardly of the chain surface during movement of the chain about sprockets or other wheels.

A yet still further object of the invention is to provide a conveyer chain so constructed as to enable the use of smaller sprockets or wheels and thus reducing the space required for such a chain.

A further object of the invention is to provide a link chain which may be manufactured economically and which is satisfactory in use.

The above, other and further objects of the invention will be apparent from the following description, accompanying drawing and appended claim.

The accompanying drawing illustrates an embodiment of the present invention and the views thereof are as follows:

Figure 1 is a fragmental side elevational view of two links showing the same in articulated position and illustrating the fact that no part of any link projects beyond the surface of the chain during articulation.

Figure 2 is a fragmental top plan view of two conveyer chains constructed in accordance with the present invention and so associated as to deliver articles from one chain onto the other.

Figure 3 is an enlarged vertical sectional view taken substantially in the plane of line III—III of Figure 2.

Figure 4 is an enlarged fragmental view in plan of the outside of link constructed in accordance with the present invention and showing the manner in which links are connected together to form a chain.

Figure 5 is an enlarged sectional view taken substantially in the plane of line V—V of Figure 3.

Figure 6 is an elevational view of a blank from which a link of the illustrated form of chain is made.

The drawing will now be explained.

The chain of the present invention is especially adapted for conveying purposes and finds particular use in connection with transfer conveyors where it is desirable to transfer articles from one chain to another to alter the direction of movement of such articles as it is possible to arrange the transfer chains in closely associated relation whereby no appreciable space occurs between the transfer chains to cause accidental displacement of an article and wherein any bridging aprons or the like become unnecessary.

It is to be noted at the outset that the conveyer chain of the present invention is made up of links fashioned from sheet metal with the links connected together by hinge joints so that no gap occurs between adjacent links and that the joints are tight eliminating lost motion and thus eliminating noise and at the same time bringing the axis of rotation or the turning axis much closer to the surfaces of the link. As a matter of fact, utilization of links fashioned from sheet metal and connected by hinge joints results in the spacing of the surface of the links from the pintle pin as being that of the thickness of the links, thus greatly reducing the distance between the turning axis and the face surface of the links accomplishing a smoother action and preventing accidental displacement of carried articles usually attended with link chains of the present type because of the fact that the rear margins of such present type links rise above the surface of the chain during articulation and often dislodge carried articles.

A blank A is fashioned from sheet metal with projections extending from opposite margins of the body of the blank. Figure 6 illustrates one extension from one side and two extensions from the other side and the other figures of the drawing illustrate chains constructed with links of this character but it is of course understood that a different number of extensions may be provided on the two opposite margins of the link as the case demands.

The link A of Figure 6 has an extension 1 extending outwardly from the edge 2 of the blank and two extensions 3 and 4 extending outwardly from the opposite margin 5 of the blank. The extensions 3 and 4 are laterally spaced a distance substantially that of the width of the extension 1. Adjacent the extension 1 notches 6 and 7 are formed in the blank the width of which notches, that is, the distance from the top to bottom of Figure 6, is substantially that of the width of the extensions 3 and 4 so that these extensions when formed into cylindrical ears may enter the notches 6 and 7 of an adjacent link and thus aid in providing the hinge joint utilized in connecting the several links into a chain of the present invention.

After the blank A with the extensions 1, 3 and 4 has been fashioned the blank is then subjected to an operation whereby the extensions 1, 3 and 4 are bent into substantially cylindrical form to provide ears B, C, and D for the pintles 8. The extensions 1, 3 and 4 are so bent that the turning axis of the connected link includes the adjacent edges or margins of the link at a joint as indicated by the dotted lines X and Y in Figure 1.

The formation of the ears B, C, and D in the manner stated means that the pintle 8 is spaced from the outer surface of the link A only by the thickness of the link, that is, the thickness of the material of which the link is fashioned. This feature is important in that it makes possible articulation of the link A about a sprocket or other wheel without elevation of the rear edge of any link above the surface of the chain, as may be clearly seen from Figure 1.

Figures 2 and 3 illustrate two conveyer chains embodying principles of the present invention arranged as transfer chains so that articles on one may be delivered onto the other.

Chain E may be presumed to be moving in the direction of the arrow of Figure 2 and chain F at right angles to chain E and moving in the direction of the arrow along side this chain.

The construction of the ears B, C and D in the manner stated enables the use of a smaller sprocket or wheel for supporting a chain of the present invention for service.

Figure 3 illustrates a sprocket wheel 9 connected to a shaft 10 by a key 11 or a set screw 12 which sprocket has formed on its surface a plurality of substantially semi-cylindrical recesses 13 serving as teeth for engaging the ears to drive or carry the chain. Because of the construction of the chain of the present invention, the diameter of the sprocket or wheel 9 may be substantially that of the distance between the opposed runs of the chain as may be observed in Figure 3.

The construction of a chain of the present invention is such that all driving from the sprocket 9 is against the ears surrounding the pintle 8 and not directly against the pintle as is common practice with link chains in use at the present time.

The sprockets or other wheels 9 used in connection with this chain are in length that of the combined length of the ears B, C and D as may be observed from Figure 3. In this manner the driving forces are equally distributed against the ears and relieved from the pintles 8. A more uniform driving results and less wear ensues.

End plates 14 and 15 are applied at the ends of the sprockets or wheels 9 to serve as guides for preventing lateral movement of the chain with respect to the sprockets or wheels. These plates may be secured in any suitable and desirable manner.

The pintles 8 are fastened in the ears C and D against rotation with respect to these ears but have loose movement with respect to the ears B. In this manner wear on the pintles is reduced to a minimum and a greater bearing surface between the pintles and the ears is secured.

It will be observed that a chain constructed in accordance with the present invention enables positioning one of these chains in close proximity to another such as the chains E and F of Figures 2 and 3 for transfer purposes. It will be observed from Figure 3 that the space between the end of the chain E and the side of chain F is so slight as to eliminate any possibility of accidental displacement of an article on either of these chains during its transfer to the other and that space is so slight as to eliminate the need for bridging aprons or like structures.

Chains of the present invention have found ready and successful use in conveying mechanisms for bottle washing machines, where bottles of various sizes are conveyed out of the machine on one conveyer, say the conveyer E, and transferred to another conveyer, say the conveyer F, for future disposal or collection. The fact that bottles of different sizes are washed by such machines makes it imperative that the space between chains E and F be small enough to prevent accidental displacement of the smallest bottle capable of washing in the machine, and chains of the present construction make this possible.

The invention is claimed as follows:

An endless conveyer having a smooth flat upper run, said conveyer consisting of hinged link members each of which contains a flat top surface, ears extending from each link for receiving a pintle pin, notches adjacent said ears for receiving therein ears from the adjoining link and portions of each side of the link extending transversely beyond the ears whereby a similar linked conveyer positioned to travel normal to the first conveyer may be brought into contiguous underlying relation to receive material discharged transversely.

ROBERT J. WYNNE.
PAUL H. MEYER.